July 2, 1946.  C. E. MEYERHOEFER  2,403,108
LAMP
Filed April 21, 1944   2 Sheets-Sheet 1

INVENTOR.
Carl E. Meyerhoefer
BY Duell, Kane & Smoot
ATTORNEYS

July 2, 1946.  C. E. MEYERHOEFER  2,403,108
LAMP
Filed April 21, 1944  2 Sheets-Sheet 2

INVENTOR.
Carl E. Meyerhoefer
BY
Duell, Kane & Smoot
ATTORNEYS

Patented July 2, 1946

2,403,108

UNITED STATES PATENT OFFICE 2,403,108

LAMP

Carl E. Meyerhoefer, Brooklyn, N. Y., assignor to E. A. Laboratories, Inc., Brooklyn, N. Y., a corporation of New York Application April 21, 1944, Serial No. 532,113

6 Claims. (Cl. 171—97)

This invention relates to projectable and retractable lamps with automatic control and illumination.

The invention is particularly applicable to lamp structures which are normally concealed, as in an airplane wing or a portion of an automobile body, and projectable by electric motor means from a protected housing or concealment to an operative position.

Exemplifying this invention with respect to airplane landing lamps, the operations required of the pilot are reduced to a minimum by the provision, in the invention, of structure wherein closing the motor circuit switch by the pilot automatically effects projection and illumination—or retraction and extinguishment—of the lamp.

It is an object of the invention, therefore, to provide improved operating structure for a projectable and retractable lighting device.

It is an object of the invention to provide operating means for a normally concealed lamp which automatically effects projection or retraction of a normally housed lamp, and correlates the projection or retraction with illumination or extinguishment of the lamp.

It is an object of the invention to provide means whereby in a pivotally mounted lamp structure, illumination or extinguishment of the lamp may be adjustably correlated with movement of the lamp structure.

It is an object of the invention to provide simple and effective means for automatically controlling the projection and illumination—or retraction and extinguishment—of a normally concealed lighting device.

This application is a continuation in part of my presently copending application Serial No. 450,561, filed July 11, 1942, entitled "Lamp," which became Patent No. 2,362,110 on November 7, 1944.

Referring to the drawings.

Figure 1:
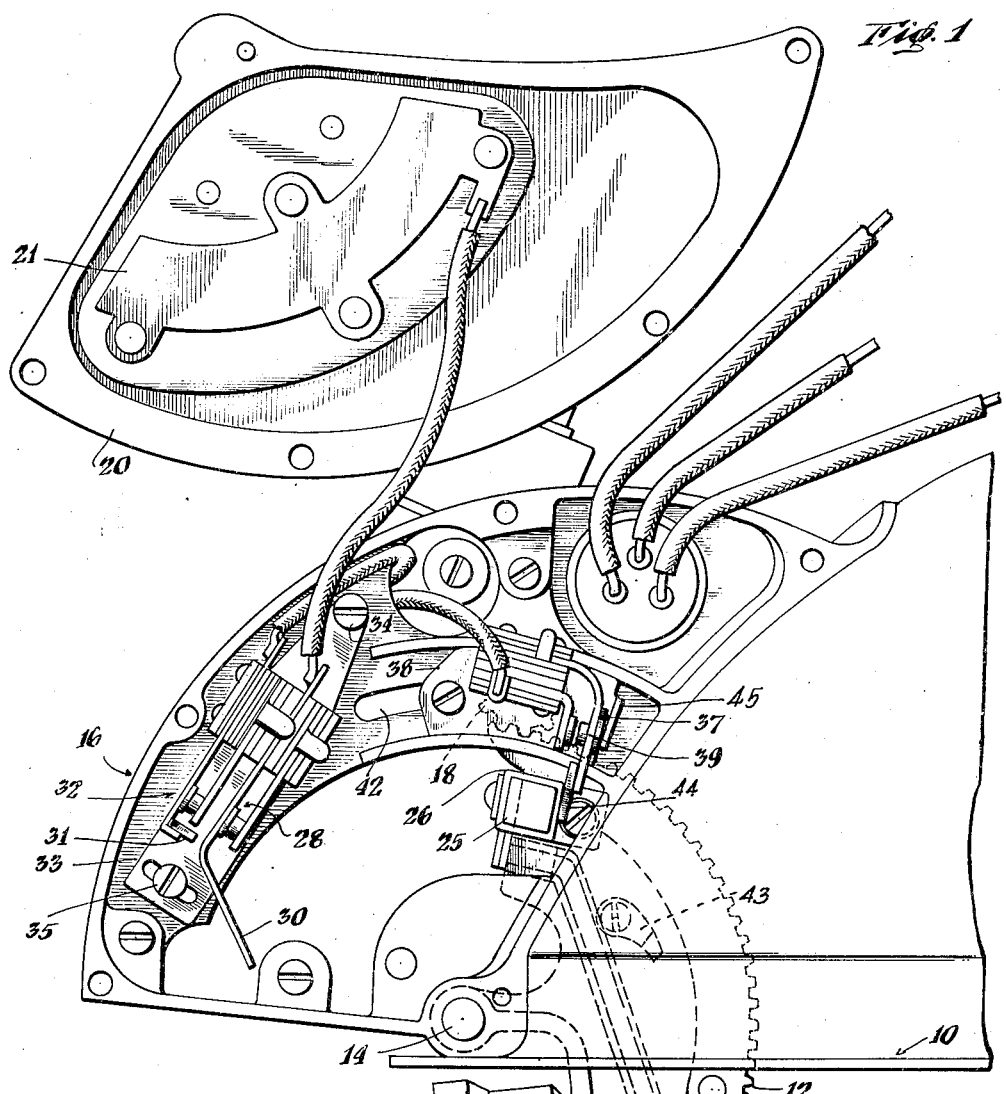
Fig. 1 is an elevation of one practical embodiment of the invention, illustratively an airplane landing lamp assembly, in which a portion of the lamp is shown as substantially fully projected from its housing, and one of the switch box cover plates has been removed to disclose certain of the operating devices.
Figure 5:
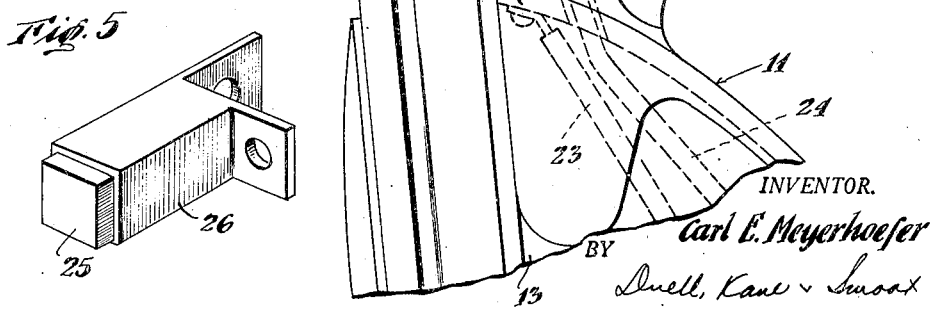
Fig. 5 is a perspective of a contact structure, the housing of which cooperates with the lamp and motor control switches to open or close the same.

Referring to the drawings, Fig. 1 discloses such portion of a retractable lamp, such as an aircraft landing lamp, as is necessary for the understanding of the present invention. In brief, the lamp structure comprises a housing and control assembly 10, usually disposed within the wing of an airplane, and a lamp 11 pivotally mounted with respect to the structure 10 as by the rack 12 secured to the reflector casing 13. Rack 12 is pivotally mounted as at 14, and thereby serves rotatably to support the lamp 11.

An electric motor 15, having forward and reverse drive field windings, is mounted on a gear and switch housing 16, and is operatively associated with the rack 12 as by the illustrated gear train 17. The rack 12, driven by pinion 18, is entirely within the housing 16, when the lamp 11 is in fully retracted position.

A suitable cover plate 20 serves to enclose the housing 16, and insulatedly mounted upon an inside surface of said cover 20 is an arcuate contact strip 21.

Figure 4:
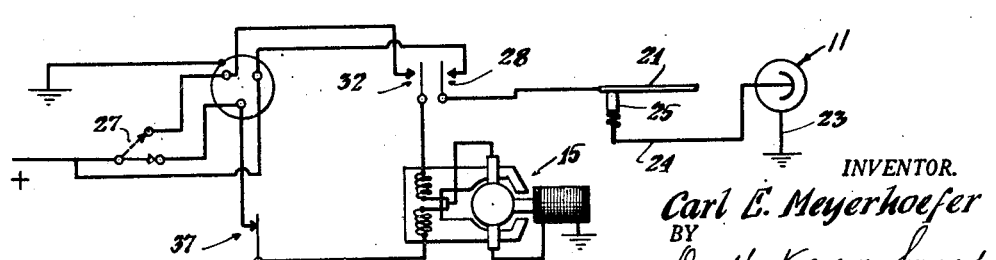
Fig. 4 is a wiring diagram of the lamp and motor-control circuit thereof.

Suitable electrical connections, as illustrated in Fig. 1, energize the lamp and motor circuits, in accordance with the schematic wiring diagram of Fig. 4.

In application of the instant invention to airplane landing lamps, it is obvious that the operation of the lamp, i. e., the illumination thereof, and the projection and retraction from or into the housing 10 must be as automatic as possible to relieve the pilot of a sequential series of manual operations, and yet must be sufficiently simple that there will be little to become disordered or inoperative through continued use.

In the lamp circuit, per se, one conductor 23 from a lamp terminal is grounded to the housing; the other terminal is connected to a conductor 24 which advantageously passes through a channel in the rack 12, see Fig. 1, for electrical connection with a spring pressed contact 25 adjustably mounted on the said rack.

The contact 25 is desirably of substantial area and volume, and hence is capable of carrying sustained electrical loads of relatively high magnitude. The contact 25 is slidably housed within a casing 26 of insulation material, and forms, with the arcuate contact plate 21 with which it is continuously in association, an element of the lighting circuit, see Fig. 4.

Manual control over the operation of the landing lamp may be by a single pole double throw switch 27, see Fig. 4, which in one or the other position excites the respective field winding to drive the motor 15 in such direction as effects the projection or retraction of the lamp.

The lamp control switch 28 is of a leaf spring type, and an extension arm 30 thereof projects into the path of the casing 26 of contact 25 in such manner that with the lamp in retracted position, the engagement of the housing 26 with the said arm 30 actuates the arm to open the contacts of switch 28. By means such as an insulating block 31 provided on a second spring switch 32, the contacts of said second spring switch arm are also opened. This second switch 32 is in circuit with the reversing field of the motor 15. The respective switches 28, 32 are on a common base 33 which is pivotally mounted as by a screw 34 and locking screw 35. Also, the casing 26 of the contact 25 is adjustably, i. e., pivotally mounted upon the rack 12, as by a screw 36. Therefore, the instants of operation of the respective switches are adjustable with respect to the arcuate movement of the rack 12, and correspondingly, the contact casing 26.

A second motor control switch 37, supported on base 38 between arcuate ribs or trackways 40, 41 is adjustable within the limits of a slot 42. Said switch 37 is in closed circuit position when the lamp is retracted, and is in circuit with the manual control switch 27.

As is seen in Fig. 4, a suitable wiring arrangement comprises connecting the manually operated motor control switch 27 in such manner that it can be thrown selectively in series with either of the motor switches 32, 37, depending upon the desired direction of rotation of the motor. The lighting circuit is desirably entirely independent of switch 27, being controlled only by the switch 28.

Closing of switch 27 by the pilot will start the operation of the motor to project the lamp 11 out of its housing 10. As the rack rotates clockwise of Fig. 2 about its pivot 14, the casing 26, after about ten degrees rotation of the rack 12, disengages from the lamp operation switch arm 30, closing the switch to illuminate the lamp 11. The lamp and motor circuits are continuously and conjointly energized until the casing of contact 26 abuts against the actuating arm 39 of motor switch 37; and continued rotation through the final degrees of movement of the rack 12 opens the contacts of the motor switch 37, whereupon the motor circuit is opened and lamp rotation stops forthwith. The lamp circuit remains closed.

Figure 2:
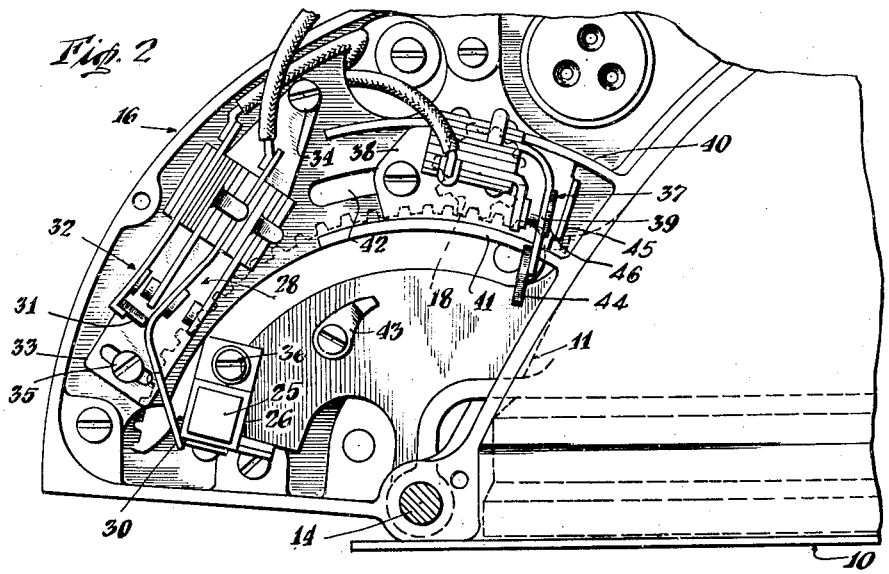
Fig. 2 is a view similar to Fig. 1 showing the landing lamp in fully retracted position.
Figure 3:
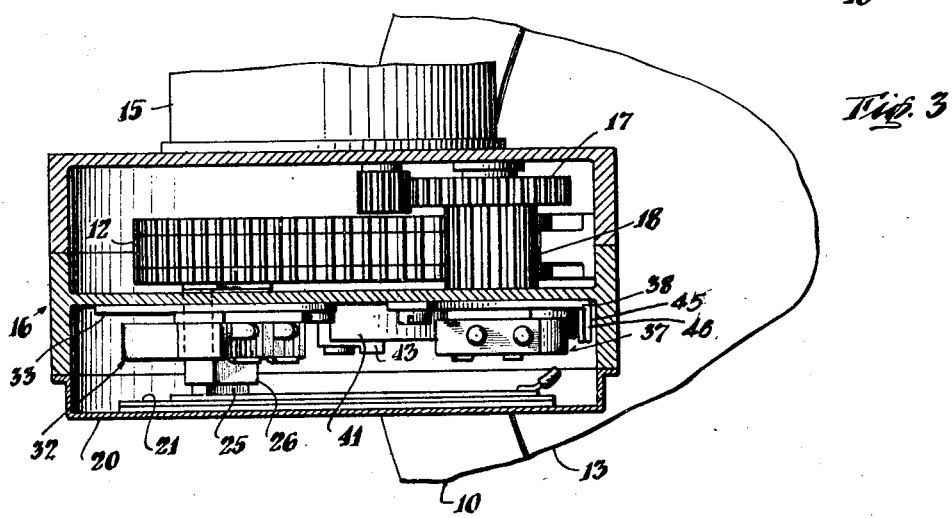
Fig. 3 is a section taken on lines 3—3 of Fig. 2.

As shown in Fig. 2, the motor reversing switch 32 will close immediately after clockwise rotation of rack 12 commences. Preferably, the motor switch 32 closes within a five degree travel of the rack, and therefore the lamp 11 is immediately in position for retraction. The switch 32 is not, however, in an active electrical circuit until the pilot has thrown the manual switch 27 to reversing position. The lamp remains illuminated until the housing of the lamp is substantially completed.

Shifting the base 38 of switch 37 from one end to the other of the slot 42 adjusts the time of opening said switch to stop motor 15—and hence the extent of projection of the lamp—within a range of from 73° to 85° of angular projection of the face of the lamp with respect to the plane of the housing 10. Supplemental means, such as a pivotally mounted stop 43, on rack 12, may be used in conjunction with the arcuate adjustment of switch base 38 to open the said switch after a 50° projection of the lamp with respect to the housing.

This latter adjustment is accomplished by rotating the stop 43 counterclockwise about its pivot so that its nose is in the path of an insulating member 44 on the actuating leaf 39 of switch 37.

Switch base 38 is desirably provided with an upwardly extending flange 45 against which an insulating layer 46 of leaf 39 abuts when in full open position. Flange 45 therefore acts as a positive stop which of itself will limit the arc of rotation of the rack 12.

Whereas it is obvious that among the several objects of the invention as specifically aforenoted are achieved, it is apparent that numerous changes in construction and rearrangements of the parts might be resorted to without departing from the spirit of the invention as defined by the claims.

I claim:

1. Apparatus for controlling the periods of operation of a motor having forward and reverse excitation field coils and for correlating therewith the periods of illumination of a lamp, including a normally closed switch in a motor field circuit for driving the motor in one direction, a concurrently open switch in a motor field circuit for driving the motor in the opposite direction, a switch in the lamp circuit held open by the said concurrently open switch, a double throw manually operable switch arranged for series connection with either of said motor controlling switches, whereby when said manually operable switch is closed in the circuit of the said normally closed switch the motor will operate; and means driven by the motor to concurrently close the lamp circuit switch and the initially open motor circuit switch at a predetermined time after the commencement of operation of the motor, and subsequently to open said first-named motor circuit switch.

2. Apparatus for controlling the periods of operation of a motor having forward and reverse excitation field coils and for correlating therewith the periods of operation of a second current consuming device, comprising a double throw switch for selectively energizing one of the motor field coils; a structure driven by said motor for rotation thereby, said structure having an abutment thereon; a normally closed switch in series with one of the throw positions of said double throw switch and having a movable switch member in the arcuate path of the said abutment to be engaged thereby adjacent one desired extreme of travel thereof for opening the circuit of its said switch; a normally closed switch in the circuit of said second current consuming device and having a contact element engageable by the said movable switch member to be moved to open circuit position corelatively with the movement of said switch member to open circuit position; and another normally closed switch in series with the other throw position of said double throw switch and having means disposed in the path of travel of said abutment adjacent the opposite extreme of travel thereof for opening said last-named switch as said abutment approaches its said other extreme of travel.

3. Control apparatus according to claim 2, in which the abutment is an element in the circuit of said second current consuming device.

4. Control apparatus according to claim 2, in which said motor-driven structure has a second abutment which may optionally be positioned to engage with one only of the switch means in said motor field coil circuits to open said switch means after a shorter extent of movement of said structure.

5. Control apparatus according to claim 2, in which the respective normally closed switch means may be adjusted for operation for variant arcs of rotation of the abutment.

6. Control apparatus according to claim 2, in which one of said switch means in a motor field coil circuit has a rigid structure in the path of the said abutment whereby to positively limit the extent of rotation of the motor driven structure in one direction.

CARL E. MEYERHOEFER.